(12) United States Patent
Mukherjee et al.

(10) Patent No.: US 6,806,901 B1
(45) Date of Patent: Oct. 19, 2004

(54) CONTROLLING THE RANGE AND RESOLUTION OF OFFSET CORRECTION APPLIED TO THE OUTPUT OF A CHARGE COUPLED DEVICE

(75) Inventors: Subhashish Mukherjee, Karnataka (IN); Suhas R. Kulhalli, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 939 days.

(21) Appl. No.: 09/703,476

(22) Filed: Oct. 31, 2000

(51) Int. Cl.[7] ................................................ H04N 9/64
(52) U.S. Cl. ..................... 348/243; 348/250; 348/222.1
(58) Field of Search ............................ 348/241, 229.1, 348/243, 255, 250, 222.1

(56) References Cited

U.S. PATENT DOCUMENTS

| | | | |
|---|---|---|---|
| 6,499,663 B1 * | 12/2002 | Yahagi et al. .......... | 235/462.28 |
| 6,617,567 B2 * | 9/2003 | Mukherjee et al. ..... | 250/214 A |
| 6,650,364 B1 * | 11/2003 | Itani et al. .............. | 348/229.1 |
| 6,720,999 B1 * | 4/2004 | Holberg et al. .......... | 348/222.1 |
| 6,750,906 B1 * | 6/2004 | Itani et al. .............. | 348/229.1 |
| 6,750,907 B1 * | 6/2004 | Sube ....................... | 348/229.1 |
| 6,750,910 B1 * | 6/2004 | Bilhan ..................... | 348/243 |
| 6,753,913 B1 * | 6/2004 | Bilhan et al. ............ | 348/241 |

* cited by examiner

*Primary Examiner*—Aung Moe
*Assistant Examiner*—Jacqueline Wilson
(74) *Attorney, Agent, or Firm*—J. Dennis Moore; W. James Brady, III; Frederick J. Telecky, Jr.

(57) ABSTRACT

An offset correction circuit which enables a designer to control the correction range irrespective of the amplification sought to be achieved to the image component of the input signal. The offset correction further enables the designer to perform offset correction to a low resolution. Both range and resolution can potentially be attained using only two stages thereby minimizing power consumption and also minimizing introduction of any undesirable components.

10 Claims, 3 Drawing Sheets

CONTROLLING THE RANGE AND RESOLUTION OF OFFSET CORRECTION APPLIED TO THE OUTPUT OF A CHARGE COUPLED DEVICE

RELATED APPLICATIONS

The present application is related to the following commonly assigned (or to be assigned) U.S. Patent Applications, which are both incorporated in their entirety herewith:

(1) Co-pending application Ser. No. 09/353,919, entitled, "Optical Black and Offset Correction in CCD Signal Processing", filed on Jul. 15, 1999; and (2) Co-pending application Ser. No. 09/703,471, entitled, "Offset Correction to The Output of a Charge Coupled Device", filed on even date herewith.

BACKGROUND OF THE INVENTION

1. Field of the Invention

The present invention relates to charge coupled devices (CCD) typically used to capture color pictures in digital form, and more specifically to a method and apparatus for controlling the range and resolution of the offset applied to the output of the CCDs.

2. Related Art

Charge coupled devices (CCDs) are often used to capture images received in the form of light. A CCD typically contains several pixels, with each pixel holding an amount of charge proportionate to the intensity of incident light and the length of time the light is allowed to fall on the pixel. The charge can be later translated to a voltage level and/or digital data for further processing and/or storing (in mass non-volatile storage). CCDs thus find application in devices such as digital cameras and scanners as is well known in the relevant arts.

A correction (termed "offset correction") is often applied to the output (i.e., voltage or digital data in the above paragraph) of a CCD typically to compensate for (or eliminate) undesirable components which may be present in the CCD output. For example, the charge generated by a CCD should ideally be entirely generated by the incident light but other phenomenon such as thermally generated electron-hole pairs add to the charge.

Such additions are undesirable, for example, because a later reproduced image may be brighter than that represented by the light incident on the CCD. Accordingly, it is desirable that the undesirable components be eliminated, and the corresponding correction is termed as offset correction. The extent to which a correction is applied, is referred to as an offset, and the act of applying the offset to the CCD output may be referred to as offset correction.

It is often desirable to control the correction range and resolution of the offset correction. The correction range refers to the maximum voltage correction (assuming zero voltage to be the minimum) that may be attained by the operation of various components of an offset correction circuit. Resolution refers to the minimum amount of correction of the output voltage that can be attained by the offset correction circuit.

However, such control may need to be achieved without introducing further undesirable components into the CCD output and/or increasing substantially the electrical power consumption in the process.

SUMMARY OF THE INVENTION

An aspect of the present invention provides a designer the ability to control the correction range and to attain low correction resolution while minimizing the introduction of additional undesirable components (noise) in the CCD output voltages. The introduction of noise can generally be minimized by minimizing the number of stages in the correction circuit. Minimizing the number of stages has the additional benefit of reducing power consumption requirements.

In one embodiment, only two stages are required to achieve desired gain. Correlated double sampling operation is performed in the first stage while attaining some amount of gain. The second stage is used to attain the remainder of the desired gain using a programmable gain amplifier (PGA). While the described embodiments contain only two stages, it should be understood that several aspects of the present invention can be implemented using a different number of stages.

Offset correction is attained by using two digital to analog converters (DAC), with each DAC controlling the correction in one stage. The first DAC is referred to as the coarse DAC (CDAC) which is connected to a correlation double sampler (CDS) located in the first stage. The second DAC is referred to as a fine DAC (FDAC), and is connected to the PGA in the second stage. While a solution could be implemented using only a single DAC, the same would typically require a DAC of very high resolution, which provides challenges in implementation and would normally consume more power.

CDS may be implemented to amplify the input signal (voltage from the CCD) while partially correcting the signal. The correction may be controlled by a first capacitor (Ccdac) driven by the CDAC. The input signal may be received via a second capacitor (Csinp). The second input of both the first capacitor and the second capacitor are coupled to a feedback capacitor (Cfcds) implemented in conjunction with the CCD.

As would be readily appreciated, the gain of the input signal component (as present at the output of the CCD) is determined by the ratio Csinp/Cfcds. Assuming that the voltage applied at the output of CDAC equal Vcdac and that the input voltage equals Vi, the total output (Vcds) of the CCD equals ((Vi*Csinp/Cfcds)−(Vcdac*Ccdac/Cfcds)), wherein '*' represents a multiplication operation. The capacitors and their capacitance values are represented by the same reference labels in the present application.

According to an aspect of the present invention, the ratio of Ccdac to Csinp is maintained to be a constant, which allows the offset effected to be independent of the voltage level Vi. The need for such independence may be appreciated by first understanding that it may be desirable to amplify the input signals to a degree which is inversely proportionate to the maximum possible amplitude (or range, if minimum is not equal to zero) of the input signal. Typically, the ratio of Ccdac/Cfcds is controlled to attain the desired amplification of the input signal in the first stage. By maintaining Ccdac/Csinp to be a constant, the offset correction due to the first stage can be determined by Vcdac, which in turn is determined by a numerical input to CDAC.

The output of the CDS may be connected to a capacitor Cspga, which in turn is corrected to the PGA of the second stage. Offset correction is further effected by a capacitor (Cfdac) driven by a fine DAC (FDAC). The second input of both Cspga and Cfdac is connected to a feedback capacitor (Cfpga) associated with the PGA. The output of PGA (Vpga) may be given by the equation ((Vcds*Cspga/Cfpga)−(Vfdac*Cfdac/Cfpga)), wherein Vfdac represents the output voltage of the FDAC.

According to another aspect of the present invention, the ratio of Cfdac to Cfpga is maintained to be a constant, which allows the correction resolution to potentially equal a least significant bit of an ADC (used to sample the output of the PGA). That is, the present invention allows offset correction to be effected by minute (small) amounts limited only by the resolution of a later sampling ADC.

Thus, once total desired amplification of the input signal (Vi) is determined, partial amplifications for each of the two stages may be assigned. The capacitances (Csinp, Cspga, Cfpga and Cfcds) may be configured consistent with the assigned partial amplifications. The capacitances Ccdac and Cfdac may be configured consistent with the objectives noted above with reference to correction range and correction resolution. By using the features of the present invention, offset correction, which quickly removes (at least substantially) the undesirable components, may be implemented.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An aspect of the present invention enables the correction range and resolution to be controlled by appropriate configuration of capacitors used in conjunction with amplifiers in the offset correction circuits. The correction range is maintained to be a constant irrespective of the gain sought to be achieved on the input signal, and the correction resolution can be as low as that possible by a least significant bit of an analog to digital converter (ADC) used to sample the corrected signal (in the process of digitizing the signal representing light).

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
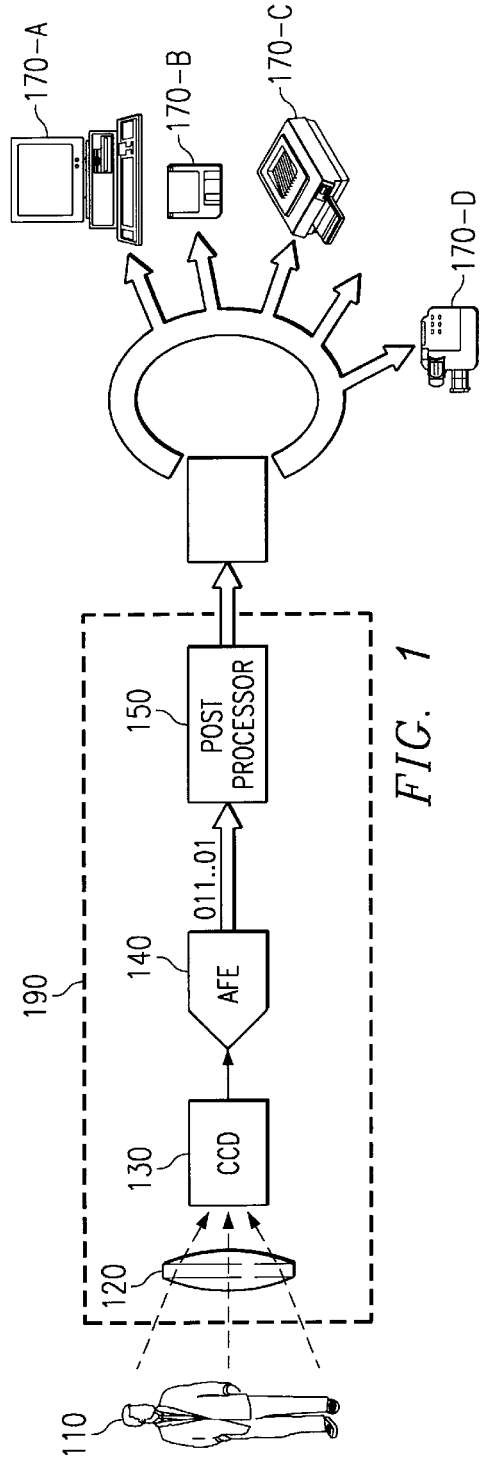
FIG. 1 is a block diagram illustrating an example environment in which the present invention can be implemented.

FIG. 1 is a block diagram illustrating an example environment in which the present invention can be implemented. There is shown the light from image 110 being allowed pass through device 190 (such as a digital camera or a scanner). The output of device can be used for further processing, printing or storing, etc., as described below in further detail.

With respect to device 190, the light from image 110 is shown being focused on CCD 130 by lens 120. CCD 130 contains several pixels which are charged proportionate to the product of the incident light intensity and the time of exposure to the light. The charge is converted into voltage in a known way and transferred to analog front-end (AFE) 140.

AFE 140 converts the received voltages into digital values, and transmits the digital values to post processor 150. AFE 140 may employ techniques such as correlated double sampling (which are well known in the relevant arts) in the course of generating the digital values. AFE 140 receives voltage values corresponding to both dark pixels and active pixels and performs offset correction in accordance with several aspects of the present invention as described below in further detail.

Post processor 150 processes the digital values received from AFE 140, generally to enhance the quality of image represented by the digital values and/or to convert the data into suitable format for storing. The resulting output data may be used in several ways, for example, viewed/edited by computer system 170-A, stored in floppy disk 170-B, printed on a printer 170-C r transferred to video player 170-D.

However, as noted in the background section above in greater detail, a robust offset correction approach may be needed to ensure that the reproduced images (e.g., in 170-A through 170-D) accurately represent image 110. An example offset correction approach implemented within AFE 140 is described below.

3. Method

Figure 2:
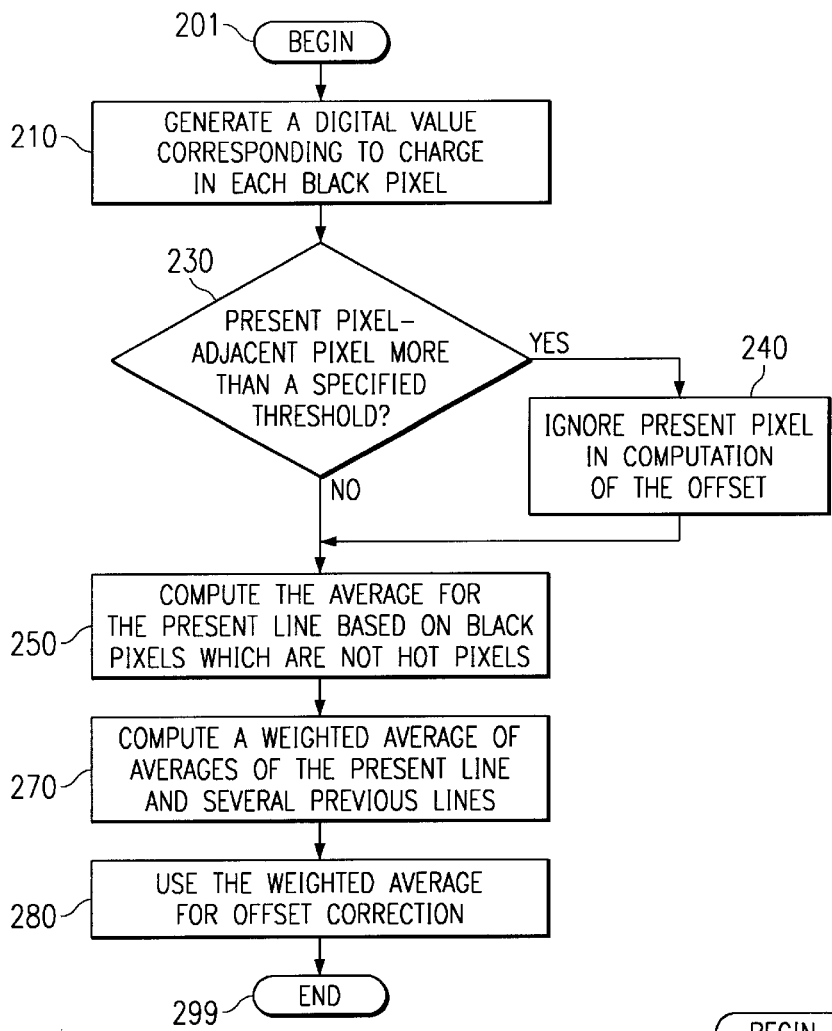
FIG. 2 is a flow chart illustrating a method in accordance with the present invention.

FIG. 2 is a flow chart illustrating a method for offset correction implemented in accordance with the present invention. The method begins in step 201, in which control immediately passes to step 210. In step 210, the charge in each black pixel of a CCD is converted to a digital value.

In step 230, the present pixel (or the digital value thereof) is compared to an adjacent pixel, and if the difference exceeds a threshold, the present pixel is ignored in the computation of the offset as noted in step 240. In one embodiment, the a previous pixel is used as the adjacent pixel. If the difference does not exceed the threshold, control passes to step 250.

In step 250, an average of the pixels for a present line is computed based on the black pixels which have been determined not to be hot pixels in step 230. In an embodiment described below, the computation is simplified by using a previous pixel in lieu of the present pixel in the computation.

In step 270, a weighted average of the averages (computed in step 250) is computed. The closer previous lines are assigned greater weight compared to the farther lines. In step 280, the weighted average is used as the offset to correct the pixel values generated for the active pixels.

As the probability of two adjacent black pixels being hot pixels is low, there is a high probability that the hot pixels are accurately detected. In addition, as the weighted average is used as the offset value, the offset value changes gradually and is less susceptible to any error conditions in the charges related to the black pixels. An embodiment implementing the method of FIG. 2 is described below with reference to FIG. 3.

4. Analog Front End

Figure 3:
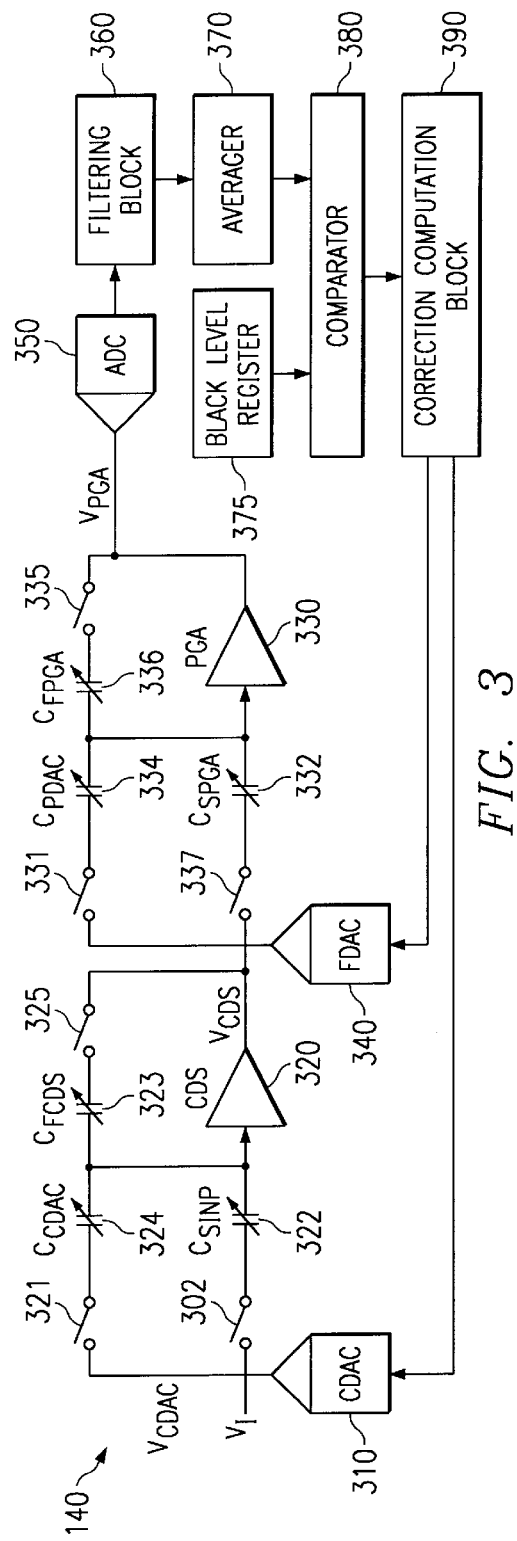
FIG. 3 is a block diagram illustrating the details of an embodiment of an analog front end provided in accordance with the present invention.

FIG. 3 is a block diagram of AFE 140 illustrating the details (in one embodiment) as relevant to an understanding of several aspects of the present invention. AFE 140 is shown containing course digital to analog converter (CDAC) 310, fine DAC 340, correlation double sampler (CDS) 320, gain amplifier 330, analog to digital converter (ADC) 350, filtering block 360, averager 370, black level register 375, comparator 380 and correction computation block 390. The operation of the capacitors and switches of FIG. 3 is described in the sections below. It may be appreciated that the computation of the offset is performed in digital domain while the correction is performed in the analog domain as described below in further detail.

ADC 350 receives analog signals which are corrected according to the offset determined by correction computation block 390 and by the configuration of various capacitors. ADC 350 samples the received analog signals to generate the digital values representing image 100. The digital values may accurately represent image 100 as the offset correction has already been performed.

Filtering block 360 is operational during the reception of pixels in the black pixels. Filtering block 360 determines whether a received digital value represents a hot pixel and communicates the result of determination to averager 370. In addition, the black pixel values are also sent to averager 370. Averager 370 computes an average value based on the black pixels which are not hot pixels. The average value may represent a weighted average of black pixels in several lines. An embodiment of averager 370 and filtering block 360 is described below.

Comparator 380 and black level register 375 facilitate a user to define a value which is potentially not equal to zero as representing black color. Black level register 375 stores such a user defined value. Comparator 380 subtracts the value in the black level register 375 from the average value generated by averager 370 to generate the offset. The parts of averager 370, comparator 380 and correction computation block 390 which together generate the offset form an example implementation of an offset generation circuit.

Correction computation block 390 generates appropriate digital values consistent with the output of comparator 380. The digital values are provided as inputs to CDAC 310 and FDAC 340, and the provided values together determine the offset correction. In general, a value provided to CDAC 310 causes a coarse correction to be attained, and a value provided to FDAC 340 causes a fine correction to be attained. The digital values (or offset in general) are adjusted iteratively until the undesirable components are accurately determined based on the black pixels.

In one embodiment, correction computation block 390 may start at a low offset value and increment the offset value during each iteration (e.g., after each line) until a desired correction level is reached. For fast convergence, the rate of change may be made proportionate to the present error (i.e., difference of accurate correction value and the present value). In addition, correction computation block 390 may clip the change in offset between successive lines to a ceiling value potentially programmable by a user, and the average or clipped value (in case average exceeds the ceiling value) is used to drive the two DACs. By clipping the values, bands may be avoided in the reproduced image. The operation of correction computation block 390 is described in further detail with reference to FIG. 5 below.

CDAC 310 and FDAC 340 convert the received digital values into analog signals, which determine the extent of correction of the active pixel digital values. The voltage levels generated by CDAC 310 and FDAC 340 are respectively represented by Vcdac and Vfdac. The outputs of CDAC 310 and FDAC 340 are respectively connected to capacitors Ccdac 324 and Cfdac 334 via switches 321 and 331. The second terminal (input) of capacitors Ccdac 324 and Cfdac 334 is connected respectively to feedback capacitors Cfcds 323 and Cfpga 336.

It should be appreciated that the course and fine DACs respectively effect corrections with course and fine granularities. By using the two DACs, one may conveniently avoid a single DAC with a very high resolution. However, embodiments using a single DAC are also contemplated to be within the scope and spirit of several aspects of the present invention.

Switches 302, 321, 337 and 331 are respectively closed (by a controller, which is not shown in the Figures) to charge the capacitors Csinp 322, Ccdac 324, Cspga 332 and Cfdac 334. In one embodiment, the four switches may be kept closed for half a clock cycle and open for another half cycle. Switches 325 and 335 are also closed for the other half of the clock cycle during the amplification of the input signals Vi and Vcds.

CDS 320 performs correlation double sampling well known in the relevant arts. In addition, CDS 320 amplifies the input signal Vs received via switch 302 and sampling capacitor Csinp 322. The capacitances of the capacitors are indicated by the same alphabetical part of the reference label (e.g., Ccdac represents the capacitance of capacitor Ccdac 324) in the present application. The output Vcds of CDS 320 is provided by the equation:

$$Vcds = (Vi * Csinp/Cfcds) - (Vcdac * Ccdac/Cfcds) \qquad (1)$$

wherein '*' represents a multiplication operation.

Gain amplifier 330 amplifies Vcds signal received via switch 337 and sampling capacitor Cspga 332. The output Vpga of gain amplifier 330 is given by the equation:

$$Vpga = (Vcds * Cspga/Cfpga) - (Vfdac * Cfdac/Cfpga) \qquad (2)$$

From Equations (1) and (2), it may be readily observed that the input signal Vi is amplified and the offset correction is performed prior to sampling by ADC 350. The extent of amplification and correction are determined by the capacitances. The values using which the capacitors are conveniently configured is described below with several examples.

Thus, AFE 140 may accurately determine the hot pixels and correct the output of CCD 130 to facilitate precise reproduction of image 110. The description is continued with example embodiment(s) of filtering block 360 and averager 370.

5. Amplification of Input Signal Vi

Depending on the signal strength range expected of Vi, a user (which uses the circuit of FIG. 3) may specify the total amplification desired for the input signal. Higher amplification is generally appropriate for weaker input signals. The total amplification may then be split for the two stages. The sampling and feedback capacitors in each stage may be programmed consistent with the amplification sought in the corresponding stage.

For illustration, it is assumed that a total gain of 15 db is desirable, which corresponds to 12 db+3 db. 12 db corresponds to a gain of 4 and 3 db corresponds to a gain of 1.41. The split may be decided by an internal decoder logic as 12 db (gain of 4) for CDS 320 and 3 db(1.41) for PGA 330. Accordingly, Csinp/Cfcds is set equal to 4, and Cspga/Cfpga is set equal to 1.41. Hence Csinp 322 is adjusted to 4 units (say pF) and Cfcds 323 to 1 unit (say 1 pF) to give gain of Cs/Cf=4. As a result, the input signal is amplified by 15 db before sampling by ADC 350.

Capacitors Ccdac 324 and Cfdac 334 may be conveniently configured to control the correction range and resolution as described below in further detail.

6. Correction Range

Correction range refers to the total offset correction which may be effected on the input signal Vi. It is often desirable to keep the correction range constant (at least approximately) such that the specific offset correction can be independent of the amplification sought to be achieved on the input signal Vi. An example may further clarify the requirement.

Suppose the voltage range of input signal is expected to be 1 Volt, for which total amplification of 1 may be suitable. On the other hand, if the expected range is 0.5 Volts, a gain of 2 may be more appropriate. Similarly, if the expected range is 0.1 Volts, a gain of 10 may be appropriate. In all the three examples, the offset correction need not scale (be amplified) with the signal. That is, if the desired offset is 0.05 Volts, the total correction should ideally be only 0.05 Volts (for each pixel) irrespective of the gain desired on the input signal Vi. Such an effect may be achieved by keeping the correction range constant as described below in further detail.

The correction range may be kept constant by keeping the ratio Ccdac to Csinp constant. To further appreciate why such a relationship provides the desired result, assume hypothetically that a voltage Vcdac' is subtracted from Vi before amplification by CDS 320 (and without being affected by charge on Ccdac 324). The output Vcds in such a situation would be:

$$Vcds=(Vi-Vcdac')*Csinp/Cfcds \quad (3)$$

From Equations (1) and (3):

$$(Vi*Csinp/Cfcds)-(Vcdac*Ccdac/Cfcds)=(Vi-Vcdac')*Csinp/Cfcds \quad (4)$$

$$Vcdac*Ccdac/Cfcds=Vcdac'*Csinp/Cfcds \quad (5)$$

$$Vcdac'=Vcdac*Ccdac/Csinp \quad (6)$$

As the maximum value of Vcdac is typically a constant, the maximum range (or upper limit) of offset correction may be maintained a constant by keeping Ccdac/Csinp constant. That is, Csinp may be determined by the desired amplification of input signal Vi, but Ccdac may be configured to keep the ratio constant. By keeping the correction range constant, the offset correction can be made to be independent of the amplification sought to be attained on the input signal Vi.

7. Correction Resolution

In general, it is desirable to have flexibility to correct the signal up to a resolution one least significant bit (LSB) of ADC 350. An aspect of the present invention enables such as an objective to be achieved by keeping the ratio Cfdac to Cfpga constant as described below in further detail.

As may be observed from Equation (2) above, the correction due to Vfdac is given by the term−(Vfdac*Cfdac/Cfpga). A change by 1 in the input of FDAC (i.e., 1 LSB of FDAC 340) typically results in a change of voltage in Vfdac of (maximum voltage−minimum voltage of FDAC 340)/2 (number of bits of inputs to FDAC 340), which equals a constant. Similarly, 1 LSB of ADC 350** may also be observed to be a constant.

Thus, by keeping Cfdac/Cfpga a constant, the relationship between 1 LSB of FDAC and 1 LSB of ADC 350 may be maintained predictable (constant) from the perspective of operation of correction computation block 390. It should be understood that the range and resolution can be controlled even if there are several intermediate stages by applying the above noted principles to the first and last stages in an offset correction circuit.

When effecting offset corrections, correction computation block 390 may first cause corrections in course grain (i.e., CDAC 310), and then use fine course corrections using FDAC 340. The description is now continued with reference to example embodiment of filtering block and averager 370.

8. Filtering block 360 and Averager 370

Figure 4:
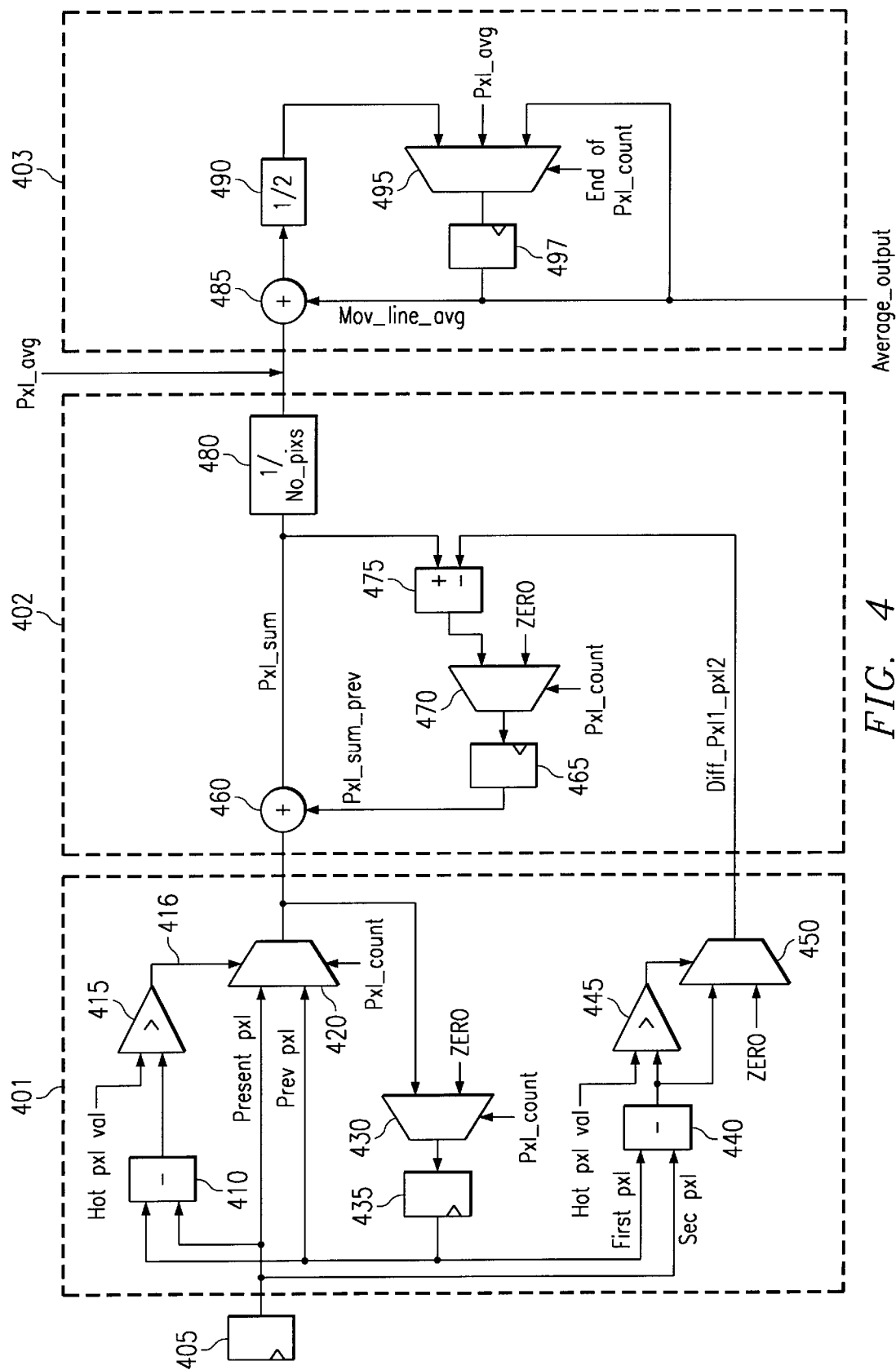
FIG. 4 is a block diagram illustrating the details of an embodiment of a filtering block and a averager provided in accordance with the present invention.

FIG. 4 is a block diagram illustrating the details of filtering block 360 and averager 370 in one embodiment. The diagram is shown containing three components 401, 402, and 403. Broadly, component 401 deals with determination of hot pixels, component 402 generates an average for black pixels in a line, and component 403 generates a weighted average of the lines. Each component is described below in further detail.

With respect to component 401, delay element 405 receives a present pixel value from ADC 350. A previous pixel value is provided from delay element 435. Adder 410 generates a difference of the present pixel value and the previous pixel value. Comparator 415 compares the difference with a threshold value and generates a logical value 416 indicating whether the difference exceeds the threshold or not. That is, logical value 416 indicates whether the present pixel is a hot pixel or not if the present pixel is a black pixel.

Pxl_count indicates whether a presently received pixel is in black area or active area. Multiplexor 420 selects the present pixel unless the pxl_count and logical value 416 together indicate that the present pixel is a hot pixel. Multiplexor 430 selects the output of multiplexor 420 if pxl_count indicates that the presently received pixel is the in the black area.

The remaining parts of component 401 enable the first pixel value to be forwarded to added 460 without having to wait for the second pixel value. Adder 440 receives the first pixel value and the second pixel value and generates a difference (pixel1−pixel2), wherein pixel1 and pixel2 respectively represent the values of the first and second black pixels in a line. Comparator 445 determines whether the difference exceeds the threshold value (similar to comparator 415).

Multiplexor 450 selects zero if the first pixel is determined not to be hot. Multiplexor 450 selects zero in the case of all other black pixels. If the first pixel of a line is a hot pixel, then pixel1−pixel2 is passed as the output of multiplexor 450. The output of multiplexor 450 is later subtracted by adder 460, with the result the second pixel in a line replaces the first pixel if the first pixel is a hot pixel.

With respect to component 402, the loop there generates a sum of the black pixel values, which are used for generating a line average. Adder 460 receives the first black pixel, even if it is a hot pixel. In the case of subsequently received black pixels, a previous pixel (or value specifically) is received in lieu of a present pixel if the present pixel is determined to be a hot pixel.

Adder 475 usually subtracts a value of zero (received from multiplexor 450) from the output of adder 460, except in situations when the first black pixel of a line is a hot pixel. When the first black pixel is a hot pixel, multiplexor 450 sends a value of (pixel1−pixel2), and adder 475 receives a value of pixel+pixel2 at the same time or clock cycles. A value of 2 times pixel2 is generated due to the subtraction, which implies that pixel2 is substituted for pixel1 when the first pixel is a hot pixel.

Multiplexor 470 selects zero as the input at the beginning of a line. Delay element 465 stores and forwards the output of multiplexor 470 to adder 460. Adder 460 continues with the addition. Thus, the output of adder 460 represents a sum of a desired number of black pixels (with a previous pixel being substituted for a present pixel if the present pixel is a black pixel, except that the second pixel is used if the first pixel is a black pixel).

Divider 480 divides the sum generated by adder 460 by the number of pixels used in the computation of the sum. In an embodiment, the number is chosen to be a power of 2 such that divider 480 may be implemented as a shift register. Thus, the output of divider 480 represents a line average at the end of the reception of black pixels of each line.

With respect to component 403, the loop there computes a weighted average of several line averages. Adder 485 is reset to zero at the beginning of processing of each image frame. Divider 490 divides the output of adder 485 by two. Delay element 497 stores the output of multiplexor 495 and provides the stored value as an input to adder 485.

Multiplexor 495 selects the output of divider 490 except in situations noted below. Multiplexor 495 is designed to select the output of divider 480 after the reception of the first line such that the output of averager 370 equals the average value of the first line itself (and not half of it). Multiplexor 495 is designed to select the output of delay element 497 in situations when the line average is determined to be erroneous. An error may arise, for example, when the components of AFE 140 are not yet configured during initial power-up or boot-up process.

Thus, the output of adder 485 represents the expression (n/2+(n−1)/4+(n−2)/8+ . . . ), wherein '−' represents subtraction, '/' represents division, n represents the average for a present line, n−1 the average for a previous line, and the numbers 2, 4, and 8 represent the associated weights. It should be understood that the offset may be generated using different types of weights as also, and such implementations are contemplated to be within the scope and spirit of the present invention.

The weighted average computed at the end of each line may be used to drive CDAC 310 and FDAC 340. Once the offset correction is performed by the outputs of the DACs, the corrected voltage levels are sampled by ADC 350. Due to the potentially accurate offset correction, the digital outputs of ADC 350 may accurately represent image 110. The description is continued with reference to the manner in which correction computation block 390 may change the offset in response to the error determined by averager 370.

9. Correction computation block 390

Figure 5:
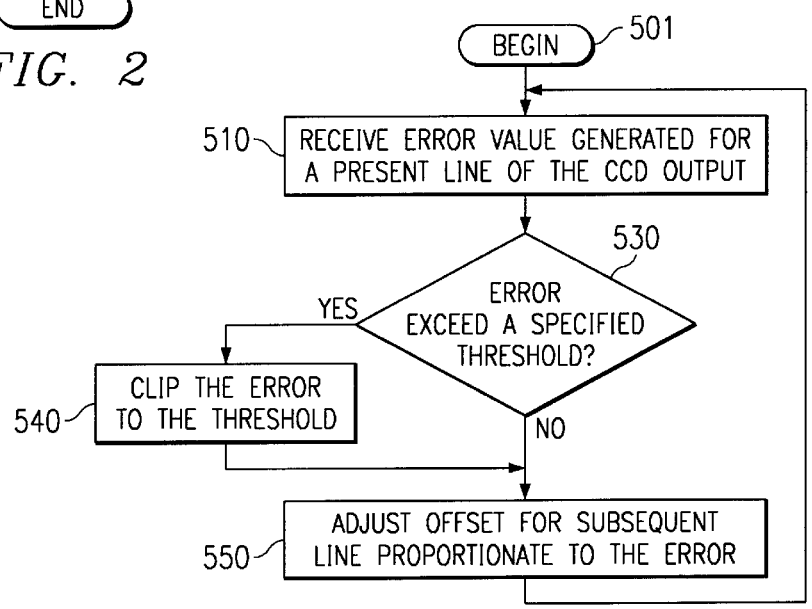
FIG. 5 is a flow chart illustrating the manner in which an offset is changed according to an aspect of the present invention.

FIG. 5 is a flow chart illustrating the operation of correction computation block 390 in an embodiment. The method begins in step 501, in which control immediately passes to step 510. In step 510, correction computation block 390 receives an error value computed typically at the end of reception of the black pixels for each line.

In step 530, correction computation block 390 determines whether the received error value exceeds a specified threshold. The threshold is preferably programmable by a user. If the error value exceeds the threshold, control passes to step 540 or else control passes to step 550. In step 540, the error value is clipped to the threshold and control then passes to step 550.

In step 550, the offset is adjusted proportionate to the error and the two DACs are configured according to the adjusted offset. Control then passes to step 510. While the adjustment is described as being performed after clipping (of step 540), it should be understood that the adjustment may be performed without clipping also. As the offset is adjusted proportionate to the error, the offset correction may converge quickly to the steady state value. Thus, different aspects of the present invention allow for useful features in the offset correction of the CCD output.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A processing circuit for processing the output of a charge coupled device (CCD), said processing circuit comprising a plurality of stages, a first stage contained in said plurality of stages comprising:

a first digital to analog converter (DAC) generating a first voltage in response to receiving a first digital value;

a correlation double sampler (CDS) receiving an input signal via a first sampling capacitor, wherein said input signal comprises said output of said CCD;

a first feedback capacitor coupled in parallel to said CDS; and a first DAC capacitor coupled to said first DAC, said first DAC capacitor being charged by said first voltage, a second terminal of said first DAC capacitor being coupled to said first feedback capacitor, wherein the output of said CDS contains an amplified component of said input signal less an amplified component of said first voltage, wherein the ratio of capacitances of said first sampling capacitor and said first DAC capacitor is maintained a constant.

2. The processing circuit of claim 1, wherein said plurality of stages contains a second stage, said second stage comprising:

a second DAC generating a second voltage in response to receiving a second digital value;

a programmable gain amplifier (PGA) receiving the output of said CDS via a second sampling capacitor;

a second feedback capacitor connected in parallel to said PGA; and a second DAC capacitor coupled to said second DAC, said second DAC capacitor being charged by said second voltage, a second terminal of said second DAC capacitor being coupled to said second feedback capacitor, wherein the ratio of capacitances of said second feedback capacitor and said second DAC capacitor is maintained constant.

3. The processing circuit of claim 2, wherein the capacitances of said first feedback capacitor and said first sampling capacitor is configured to attain a first amplification.

4. The processing circuit of claim 3, wherein the capacitances of said second feedback capacitor and said second sampling capacitor is configured to attain a second amplification, wherein said first amplification and said second amplification together determine a total amplification sought to be attained by said processing circuit.

5. The invention of claim 2, wherein said processing circuit comprises only two stages.

6. A device for capturing an image in a digital form, said device comprising:

a charge coupled device (CCD) containing a plurality of pixels, wherein each of said plurality of pixels stores a charge proportionate to the intensity of incident light and the time of incidence of said light on the pixel, said plurality of pixels further containing a plurality of black pixels and a plurality of active pixels, wherein said plurality of black pixels are not exposed to said light and said plurality of active pixels are exposed to said light;

a lens focusing light from said image on said plurality of active pixels;

an analog front end (AFE) comprising a plurality of stages, a first stage contained in said plurality of stages comprising:

a first digital to analog converter (DAC) generating a first voltage in response to receiving a first digital value;

a correlation double sampler (CDS) receiving an input signal via a first sampling capacitor, wherein said input signal comprises said output of said CCD;

a first feedback capacitor coupled in parallel to said CDS; and a first DAC capacitor coupled to said first DAC, said first DAC capacitor being charged by said first voltage, a second terminal of said first DAC capacitor being coupled to said first feedback capacitor, wherein the output of said CDS contains an amplified component of said input signal less an amplified component of said first voltage, wherein the ratio of capacitances of said first sampling capacitor and said first DAC capacitor is maintained a constant.

7. The device of claim 6, wherein said plurality of stages contains a second stage, said second stage comprising:

a second DAC generating a second voltage in response to receiving a second digital value;

a programmable gain amplifier (PGA) receiving the output of said CDS via a second sampling capacitor;

a second feedback capacitor connected in parallel to said PGA; and a second DAC capacitor coupled to said second DAC, said second DAC capacitor being charged by said second voltage, a second terminal of said second DAC capacitor being coupled to said second feedback capacitor, wherein the ratio of capacitances of said second feedback capacitor and said second DAC capacitor is maintained constant.

8. The device of claim 7, wherein the capacitances of said first feedback capacitor and said first sampling capacitor is configured to attain a first amplification.

9. The device of claim 8, wherein the capacitances of said second feedback capacitor and said second sampling capacitor is configured to attain a second amplification, wherein said first amplification and said second amplification together determine a total amplification sought to be attained by said AFE.

10. The device of claim 7, wherein said AFE comprises only two stages.

* * * * *